United States Patent [19]
Rutan et al.

[11] Patent Number: 5,526,266
[45] Date of Patent: *Jun. 11, 1996

[54] METHOD FOR DIAGNOSING AN ENGINE USING A COMPUTER BASED BOOST PRESSURE MODEL

[75] Inventors: William K. Rutan, Chillicothe; David R. Schricker, Dunlap, both of Ill.

[73] Assignee: Caterpillar Inc., Peoria, Ill.

[*] Notice: The term of this patent shall not extend beyond the expiration date of Pat. No. 5,377,112.

[21] Appl. No.: 322,851

[22] Filed: Oct. 13, 1994

Related U.S. Application Data

[63] Continuation-in-part of Ser. No. 934,642, Dec. 19, 1991, Pat. No. 5,377,112.

[51] Int. Cl.⁶ .......................... G06F 19/00; F02D 23/00
[52] U.S. Cl. ...................... 364/431.02; 364/431.12; 364/578; 364/424.03; 364/431.11; 364/551.01; 123/357; 123/358; 60/602; 60/603; 60/608
[58] Field of Search .................. 364/431.01–431.12, 364/550, 424.03, 920, 551.01, 578; 123/357, 358, 416, 486, 501, 365, 373, 64, 318, 56.4, 478, 480; 60/602, 608, 603; 477/110, 111; 73/118.2

[56] References Cited

U.S. PATENT DOCUMENTS

| | | | |
|---|---|---|---|
| 4,368,705 | 1/1983 | Stevenson et al. | 123/357 |
| 4,604,701 | 8/1986 | Fujawa et al. | 364/431.01 |
| 4,616,616 | 10/1986 | Staniak et al. | 123/357 |
| 4,621,335 | 11/1986 | Bluish et al. | 364/550 |
| 4,671,107 | 6/1987 | Chiesa et al. | 73/118.2 |
| 4,736,715 | 4/1988 | Larsen | 123/64 |
| 4,882,905 | 12/1989 | Kawamura | 60/608 |
| 4,901,530 | 2/1990 | Kawamura | 60/608 |
| 4,964,318 | 10/1990 | Ganoung | 477/110 |
| 5,010,487 | 4/1991 | Stonehocker | 364/424.03 |
| 5,205,125 | 4/1993 | Potter | 60/602 |
| 5,377,112 | 12/1994 | Brown, Jr. et al. | 364/431.12 |

*Primary Examiner*—Kevin J. Teska
*Assistant Examiner*—Jacques H. Louis-Jacques
*Attorney, Agent, or Firm*—James R. Yee

[57] ABSTRACT

In a method for diagnosing an engine using a computer based boost pressure model, a first set of parameters of the engine is sensed and used to determined a modeled value of an exhaust temperature. A second set of parameters of the engine is sensed. A modeled value of the boost pressure is determined as a function of the second set of parameters and the modelled exhaust temperature value.

18 Claims, 6 Drawing Sheets

Fig_1_

Fig_2_

Fig_3_

Fig_4_

Fig-3

Fig_4_

METHOD FOR DIAGNOSING AN ENGINE USING A COMPUTER BASED BOOST PRESSURE MODEL

This is a Continuation-In-Part of application Ser. No. 07/934,642 filed Dec. 19, 1991, now U.S. Pat. No. 5,377,112.

TECHNICAL FIELD

This invention relates generally to a method for diagnosing an engine, and more particularly to a method for diagnosing an engine using a computer based model of boost pressure.

BACKGROUND ART

Proper maintenance of a vehicle's engine is an important priority in the daily operation of a vehicle. Without proper maintenance minor problems can escalate into major mechanical failures, resulting in costly downtime and expensive repairs.

Typically, when an operator observes a performance loss or loss of power in a vehicle's engine, the vehicle is brought into the shop for testing and repair.

Unfortunately, the best time to diagnose power-related problems is during typical driving conditions. In the shop, test data may be collected using a dynamometer. However, this data is really only useful for verifying that a power problem exits. It does not necessarily locate the problem. Additional sensors can be used with the dynamometer to pinpoint the problem. However, this adds cost and requires additional downtime (+½ day).

Therefore, the best way to diagnose the engine is by collecting data during operation and analyzing the data. Generally, this type of analysis has been confined to collecting the data and comparing the data to normal ranges or by comparing graphs of the data to standard or normal graphs. The problem with this type of method is that it does not provide on-board or real-time diagnostics. It also requires that an operator recognize a loss of power and that the vehicle is brought in for maintenance. Furthermore, it requires a great amount of skill and knowledge to equate deviations in the engine parameters to a type of problem or the location of the problem.

The subject invention is directed at overcoming one or more of the problems as set forth above.

DISCLOSURE OF THE INVENTION

In one aspect of the present invention, a method for diagnosing an engine having an exhaust manifold and a turbocharger by modelling boost pressure is provided. The method includes the steps of sensing a boost pressure of the turbocharger and at least one parameter of the engine. A modelled value of the exhaust temperature is determined as a function of the at least one parameter of the engine. The method further includes the steps of sensing at least one other parameter of the engine. A modelled value of the boost pressure is determined as a function of the one other parameter of the engine and the modelled value of the exhaust temperature. The actual boost pressure and the modelled boost pressure are compared. The engine is diagnosed as a function of the difference.

BEST MODE FOR CARRYING OUT THE INVENTION

Figure 1:
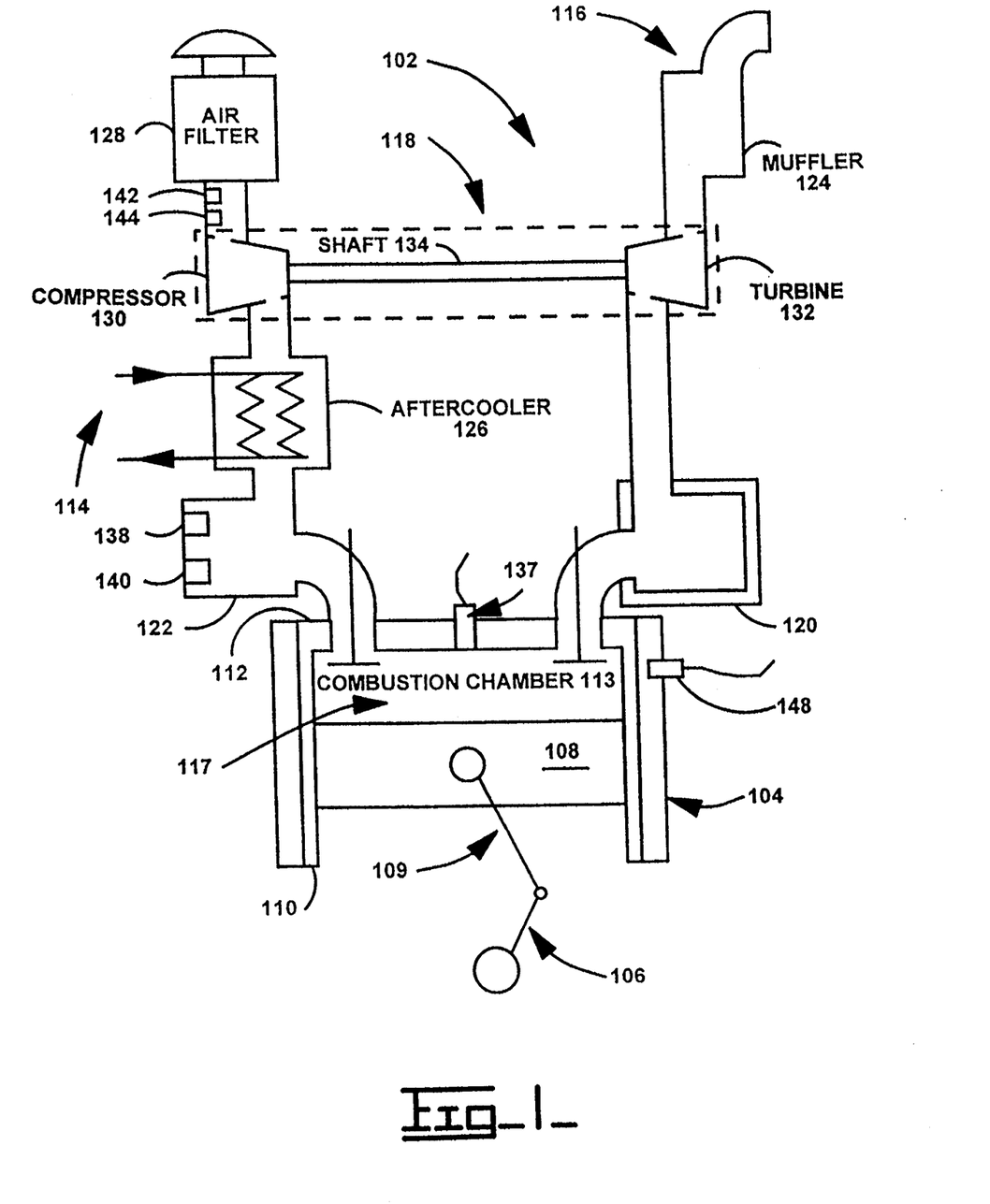
FIG. 1 is a stylized representation of an engine having a combustion system, an air intake system and an exhaust system.

With reference to FIG. 1, the present invention is adapted to model boost pressure of an engine 102. As shown in the stylized representation of the engine 102, the engine 102 includes an air intake system 114, an exhaust system 116, a combustion system 117, and a turbocharger 118. The air intake system 114 includes an air filter or cleaner 128, an aftercooler 126, and an air intake manifold 122. The exhaust system 116 includes an exhaust manifold 120 and a muffler 124.

The turbocharger 118 includes a compressor 130, a turbine 132, and a shaft 134. The compressor 130 is connected into the air intake system 114 between the aftercooler 126 and the air filter 128. The turbine 132 is connected into the exhaust system 116 between the exhaust manifold 120 and the muffler 124. The shaft 134 connects the compressor 130 to the turbine 132.

The combustion system 117 includes a plurality of cylinders 104 and a crankshaft 106. Each cylinder 104 has an associated piston 108 and piston rod 109. For the purposes of illustration, only one cylinder 104, piston 108, and piston rod 109 are shown. Each cylinder 104 includes a cylinder liner 110. Each cylinder 104 may also include a cylinder head 112 or a common head arrangement may be used. The piston 108, cylinder liner 110, and cylinder head 112 form a combustion chamber 113. The cylinder head 112 forms a passageway from the air intake manifold 122 and the exhaust manifold 120 to the combustion chamber 113. The cylinder head 112 also forms a passageway, allowing a fuel delivery system to introduce fuel into the combustion chamber 113. In the preferred embodiment, fuel is injected into the combustion chamber 113 by an electronic fuel injector 137.

Figure 2:
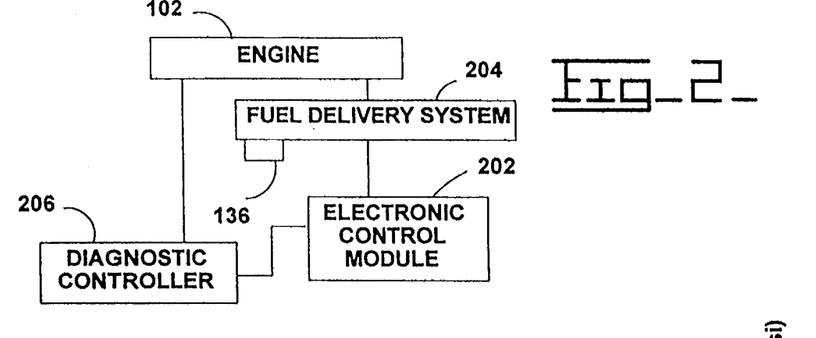
FIG. 2 is a block diagram of a diagnostic system, according to an embodiment of the present invention.

With reference to FIG. 2, the engine 102 is typically controlled by an electronic control module (ECM) 202. The ECM 202 includes a fuel delivery system or electronic governor 204. Typically, the electronic governor 204 includes a fuel injection system containing one or more electronic fuel injectors. The electronic governor 204 controls the amount of fuel delivered to the engine.

A diagnostic controller 206 receives information from the ECM 202 and directly from sensors connected to the engine 102 and uses the engine information to model boost pressure (as discussed below).

Referring to FIGS. 1 and 2, in the preferred embodiment, the diagnostic controller 206 receives information from a fuel temperature sensor 136, an intake manifold pressure (boost pressure) sensor 138, an intake manifold temperature sensor 140, a filtered air pressure sensor 142, and a filtered air temperature sensor 144. It should be noted however that some of the sensors 136–146 transmit sensor information to the ECM 202. For those sensors, the diagnostic controller 206 receives the information from the electronic control module 202. Additionally, a temperature sensor 148 is used to sense the temperature of the coolant.

Furthermore, the ECM 202 may also transmit other sensor information and other calculated engine parameters to the diagnostic controller 206. For example, the ECM 202 calculates the mass flow rate of fuel into the engine 102 as a function of engine speed (measured) and rack position or RACK. Note that the term RACK is used for historic purposes only. In engines controlled by an ECM, there is physically no rack. However the term, rack position (RACK) has been retained to refer to the amount of fuel delivered to the engine 102. The ECM 202 relays this information to the diagnostic controller 206. In the preferred embodiment, the ECM 202 also receives sensor information relating to engine speed, timing advance, and rack position or fuel rate and relays this information to the diagnostic controller 206.

In one embodiment, the diagnostic controller 206 includes a microprocessor capable of receiving the sensor information and performing the diagnostic routines on board the vehicle. One suitable microprocessor is available from Motorola Inc. of Roselle, Ill., as part no. MC68000.

In a second embodiment, the diagnostic controller 206 records or stores the sensor information in a memory for download into an external computer for analysis.

In a third embodiment, the diagnostic controller 206 includes a transmitter (not shown) for transmitting the data to a remote site for processing. A satellite system receives the signals from the transmitter and relays the signals to the remote site. One suitable transmitter is the Omnitracs Mobile Messaging Communications Terminal. A suitable satellite system service is Omnitracs Message Service. Both are available from Qualcomm of San Diego, Calif.

Figure 3:
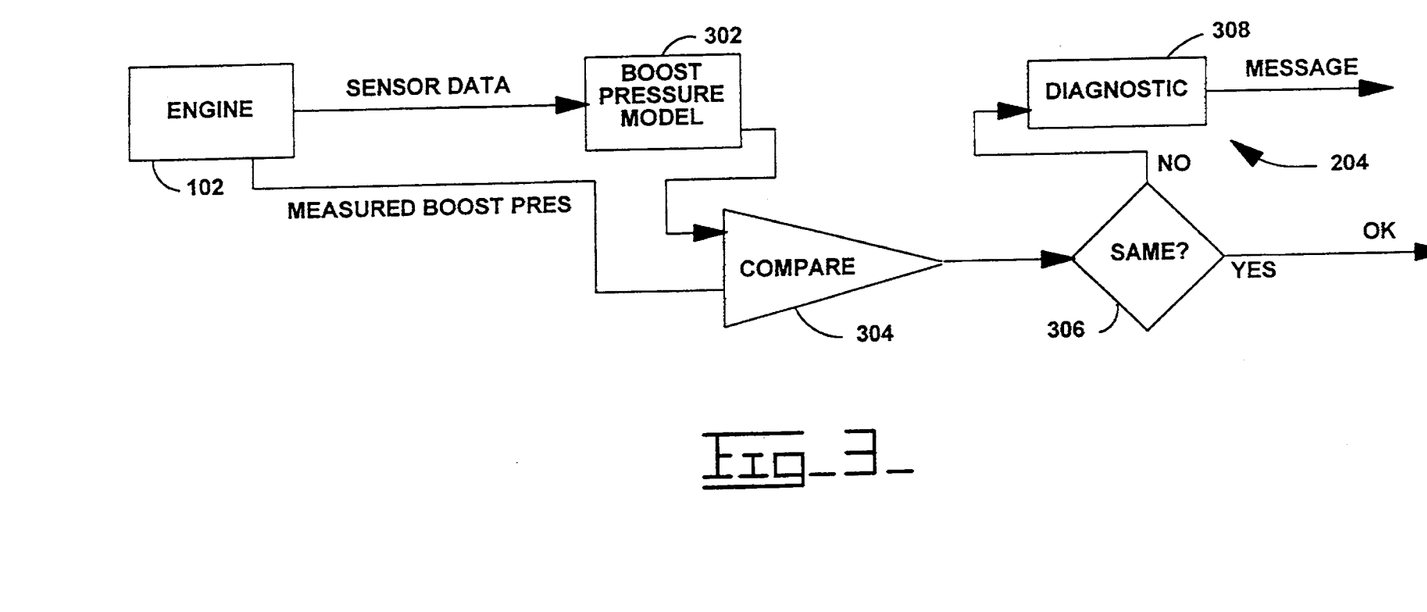
FIG. 3 is a block diagram showing the flow of information in a boost pressure model of the diagnostic system of FIG. 2, according to an embodiment of the present invention.

With reference to FIG. 3, the operation of the diagnostic controller 206 may be more easily understood by looking at the flow of information. First, sensor information is received by the diagnostic controller 206 and used in a boost pressure model 302. The boost pressure model 302 determines a modeled or predicted value of the boost pressure of the turbocharger 118. From the boost pressure sensor 138, an actual or measured value of the boost pressure is determined. The measured value and the modeled value of the boost pressure are compared and a difference signal is produced (block 304). If the measured and modelled values are the same (306) then the engine is diagnosed as operating normally. If the modelled and measured values are not the same then an error message is produced.

In the preferred embodiment, the boost pressure model treats the engine as a steady state flow pump. Therefore, engine constants (for example, BORE) are adjusted from actual values and are representative of the actual values on that basis.

Figure 4:
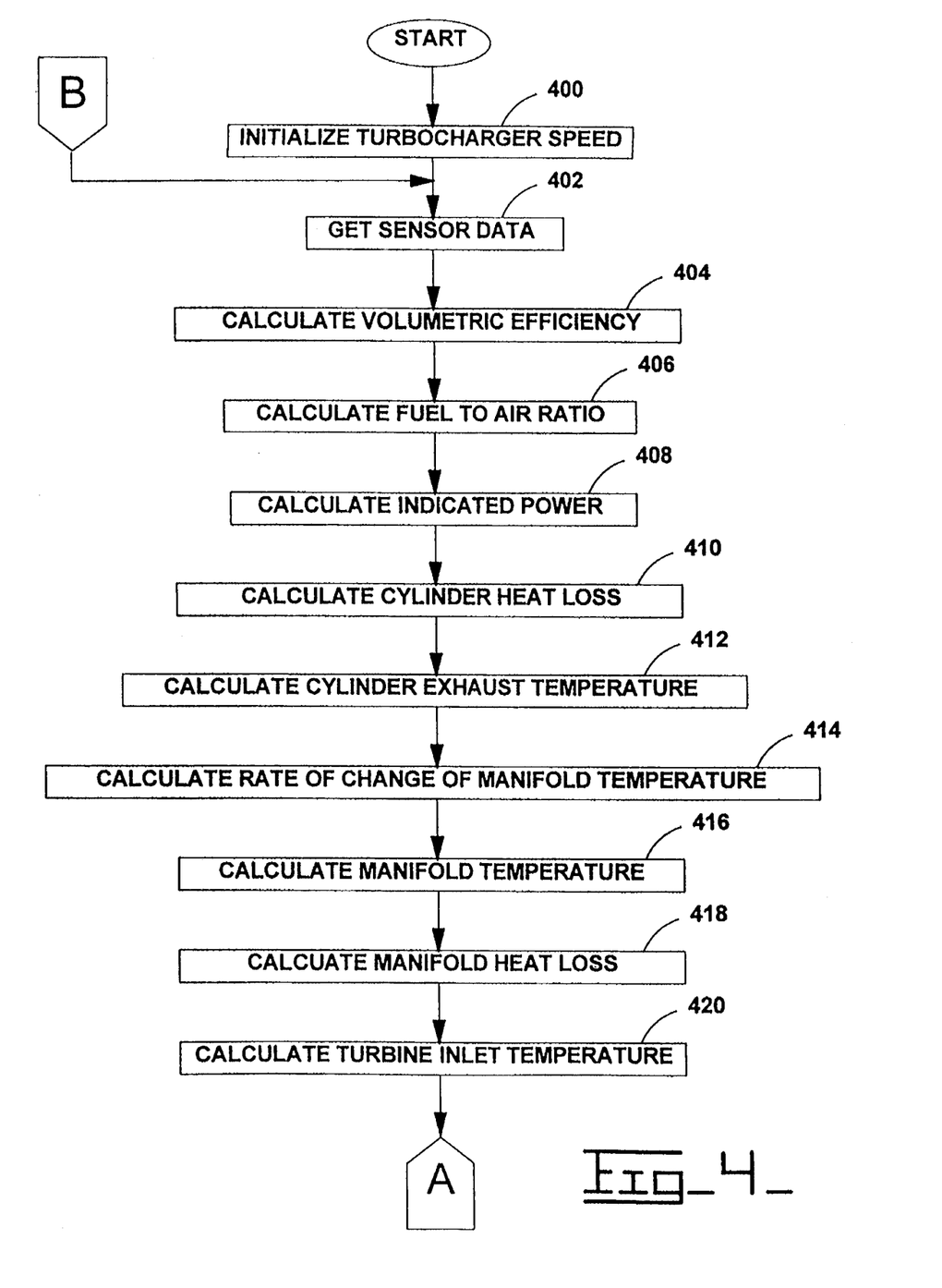
FIG. 4 is a first portion of a flow diagram illustrating the operation of the boost pressure model, according to an embodiment of the present invention.

With reference to FIG. 4, the operation of the boost pressure model will be discussed. In a first control block 400, the rotational speed of the turbocharger is initialized. In the preferred embodiment, the turbocharger speed is initialized to 30 Krpm. In determining the boost pressure, the turbocharger speed is updated. Since the turbocharger speed is arbitrarily initialized, it takes the model a short period of time for the turbocharger speed to come up to the actual turbocharger speed.

In a second control block 402, the sensor data is read. In the preferred embodiment, the boost pressure model uses the following engine information:

engine speed (SPEED), timing advance (TIMING), rack position/fuel rate (RACK), intake manifold pressure ($P_{intake}$), inlet air temperature ($T_a$), intake manifold temperature ($T_{intake}$), coolant temperature ($t_c$), fuel temperature ($t_{fuel}$), inlet air temperature ($T_a$), intake manifold temperature ($T_{intake}$), inlet air pressure ($P_a$), and exhaust temperature (modelled)($t_{ex}$).

In a third control block 404, the volumetric efficiency of the engine 102 is calculated. The volumetric efficiency (VOL_EFF) is the mass flow efficiency of the engine 102 as it acts as a positive displacement pump. In the preferred embodiment, the volumetric efficiency of the engine 102 is obtained from an engine performance map. The engine performance map is determined experimentally and the volumetric efficiency is determined as a function of the rack position and the engine speed from the electronic control module 202.

In a fourth control block 406, the fuel to air ratio of the engine is calculated. In the preferred embodiment, calculating the fuel to air ratio (F/A) is determined by first determining the density of the air at the intake manifold and the mass flow of air to the engine. The density of the air is determined by:

$$d_{air} = P_{intake}/(R_{air} * T_{intake}) \qquad \text{EQU. 1}$$

where $R_{air}$ is the gas constant for air. Note that for $P_{intake}$, the measured value or the modeled value (see below) may be used.

Using the density of air calculated in EQU. 1, the mass flow of air through the engine is determined by:

$$\overline{m}_{air} = VOL\_EFF * d_{air} * VOL\_FL\_RT \qquad \text{EQU. 2}$$

where VOL_FL_RT is the volumetric pumping of the engine and is determined by:

$$VOL\_FL\_RT = \frac{DISPLACEMENT * SPEED * 1 \text{ pump cycle}}{2 \text{ engine rev's}} \qquad \text{EQU. 3}$$

where DISPLACEMENT is the total displacement of the engine and SPEED is the engine speed.

The mass fuel flow, $\overline{m}_{fuel}$ is received from the ECM 202. Preferably, the mass fuel flow is adjusted based on the temperature of the fuel, $t_{fuel}$. The fuel to air ratio is then determined by:

$$F/A = \overline{m}_{fuel}/\overline{m}_{air} \qquad \text{EQU. 4}$$

In a fifth control block 408, the indicated power is calculated. The indicated power represents the chemical energy delivered to the pistons 108. To determine the indicated power, first the indicated specific fuel consumption is determined. The indicated specific fuel consumption represents how efficiently fuel is being converted to indicated power. In the preferred embodiment, the indicated specific fuel consumption has units of mass/(indicated power*time), for example, kg/(W*sec) and is determined using a map. The map is determined experimentally and the indicated specific fuel consumption (ISFC) is found as a function of TIMING, RACK, SPEED, and F/A. TIMING is a signal indicative of the position of the flywheel in relation to "top dead center", at which fuel is injected into the engine. Preferably, TIMING is measured in degrees of the flywheel. TIMING, RACK, and SPEED are received from the ECM 202. Second, the pumping power (PP) is determined. PP represents the work done by the engine 102 to pump fluids (gas) from intake to the exhaust manifold and is determined by:

$$PP = (P_{intake} - P_{ex} - (P_{intake} * SPEED^2 * K1)) * \frac{SPEED * DISPLACEMENT}{2}$$  EQU. 5A where, K1 is an experimentally derived constant and $P_{ex}$ is the pressure of the exhaust gas at the exhaust manifold. In one embodiment, $P_{ex}$, is measured by a sensor (not shown). In another embodiment, $P_{ex}$ is calculated as a function of the mass fuel flow, $\bar{m}_f$, mass air flow, $\bar{m}_a$, inlet temperature, $T_a$, and turbine outlet pressure. Third, the heat loss during the compression/expansion cycle (HIP) is determined by:

$$T_o = T_c + (T_{intake} - T_c) + K6.$$  EQU. 5B $$HIP = \frac{K2 * (P_{intake} * K3 + K4) * (K5 * T_o - T_c)}{(T_o - K7)(Speed * K8 + K9)} * \frac{SPEED * DISPLACEMENT}{2}$$  EQU. 5C where, K2–K9 are experimentally derived constants. Then, the indicated power can be determined by:

$$IP = \bar{m}_{fuel}/ISFC + PP + HIP$$  EQU. 5D

The power consumed by the engine by friction (mechanical losses) and other losses can be determined using a map of friction power versus engine speed. The brake power or the power available at the flywheel of the engine 102 can be determined by subtracting the friction power from the indicated power.

In a sixth control block 410, the amount of heat lost through the cylinders 104 is determined. First, an equivalence ratio (ER) is determined by:

$$ER = (F/A)/(F/A_{stoichiometric})$$  EQU. 6 where $F/A_{stoichiometric}$ is the theoretical ideal fuel to air ratio at which there is just enough oxygen present to burn all the fuel.

Then, the "effective" gas temperature is determined. The effective gas temperature is a convention representing a temperature relating to an effective wall area. It is assumed that the effective temperature is in contact with an "effective" wall area over the entire four stroke cycle of the engine 102. The effective gas temperature is determined by:

$$T_g = T_{g300} + 0.35 (T_{intake} - 300)$$  EQU. 7 where $T_{g300}$ is the gas temperature, when the intake temperature is 300K. $T_{g300}$ is determined from an experimentally derived map of $T_{g300}$ versus ER.

Next, the exhaust flow rate ($\bar{m}_{exh}$) is determined by adding the mass flow of the air and the mass flow of the fuel.

The effective wall area is an "imaginary" surface, which is in constant contact with the exhaust gas temperature. In the preferred embodiment, the effective wall area is estimated as the surface area of the combustion chamber 113 at mid or half stroke.

The effective wall area is determined by:

$$A_e = C*[(2*PI*BORE^2/4) + (PI*BORE*L*0.5)],$$  EQU. 8 where BORE is representative of the diameter of the bore, C is the number of cylinders, and L is the stroke length.

The mass flow of exhaust gas divided by the effective wall area is also determined:

$$G = \bar{m}_{exh}/A_e.$$  EQU. 9

In order to complete the calculation for the cylinder heat loss, the temperature distribution through the cylinder liner wall is determined. To determine the temperature distribution, the following parameters are calculated:

Viscosity of gas ($\mu_g$)
$$\mu_g = 2.2515 * 10^{-5} * [T_g * 0.0025]^{0.645}$$  EQU. 10

Conductivity of gas ($k_g$)
$$k_g = 3.3308 * 10^{-2} * [T_g * 0.0025]^{0.796}$$  EQU. 11

Convective Coefficient of gas ($h_g$)
$$h_g = 10.4 * k_g/BORE * (G * BORE/\mu_g)^{0.75}$$  EQU. 12

Fourier Number ($F_0$)
$$F_0 = alpha_w * \Delta t/\Delta x^2$$  EQU. 13

Biot Numbers
$$Bi_g = h_g * \Delta x/k_w$$  EQU. 14
$$Bi_w = h_{coolant} * \Delta x/k_w$$  EQU. 15 where $alpha_w$ is the diffusivity of effective wall, $\Delta t$ is the time interval or step for the model, and $\Delta x$ is the width step in effective wall.

Figure 6:
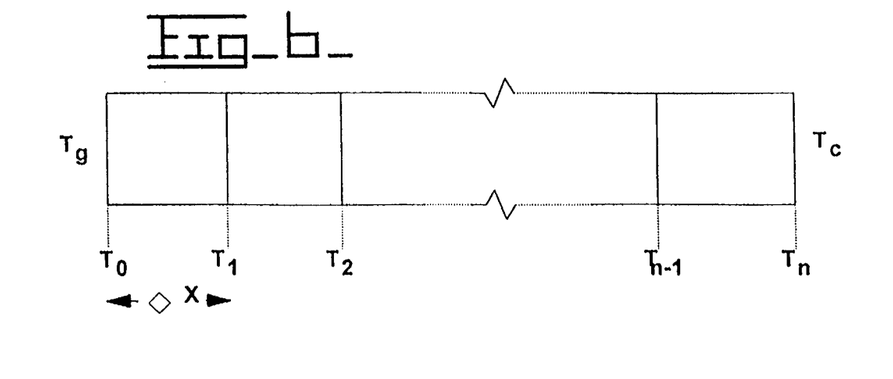
FIG. 6 is a stylized representation of the cylinder wall of the engine, illustrating temperature distribution.

With reference to FIG. 6, the temperature of a wall liner is determined for a predetermined number of steps or divisions within the cylinder wall. The steps are equally spaced apart. At startup, the temperature at each spot on the wall is set equal to the coolant temperature, $t_c$. The temperature for each of the interior wall points is then determined by:

$$t_{x,t+\Delta t} = F_0 * (T_{x+1,t} + T_{x-1,t}) + (1 - 2 * F_0) * T_{x,t}$$  EQU. 16 where x represents the current division of the cylinder wall.

The temperature at the gas side surface is then determined by:

$$T_{0,t+\Delta t} = 2*F_0*(T_{1,t} + Bi_g*T_{gas}) + (1 - 2*F_0 - 2*Bi_g*F_0)*T_{0,t}.$$  EQU. 17

The temperature at the coolant side is determined by:

$$T_{n,t+\Delta t} = 2*F_0*(T_{n-1,t} + Bi_c*T_c) + (1 - 2*F_0 - 2*Bi_c*F_0)*T_{n,t}.$$  EQU. 18

The cylinder heat loss is then determined. The cylinder heat loss is the rate at which heat is being expelled by the cylinder head, cylinders, and the pistons. The cylinder heat loss is determined by:

$$Q_{cyl} = h_g*A_e*(T_{gas} - T_{0,t})$$  EQU. 19 where $A_e$ is the effective wall area.

The temperature of the exhaust gas being expelled from the cylinder head 112 is a function of the cylinder heat loss, the power delivered to the pistons, the energy in the intake air and the energy in the fuel plus the chemical energy. The cylinder exhaust temperature (seventh control block 412) is determined by:

$$T_{ex1} = \frac{Q_{cyl} - iP + m_{air}(C_{intake} * T_{intake})}{[m_{ex} * C_{ex}]} + \frac{m_{fuel}(C_{fuel} * T_{fuel} + LHV)}{[m_{ex} * C_{ex}]}$$

EQU. 20 where $C_{intake}$, $C_{fuel}$, $C_{ex}$ are the specific heats of the intake air, fuel and exhaust gas, respectively and LHV is the lower heating value of the fuel in BTU/lbs.

The temperature of the exhaust gas must now be adjusted for the heat loss through the manifold. In order to determine the heat loss from the manifold, the following list of parameters are determined:

Viscosity of exhaust ($\mu_g$)  EQU. 21
$\mu_g = 2.2515 * 10^{-5} * (T_{ex1} * 0.0025)^{0.645}$ Conductivity of exhaust ($k_{ex}$)  EQU. 22
$k_{ex} = 3.3308 * 10^{-2} * (T_{ex1} * 0.0025)^{0.796}$ Reynolds Number ($Re$)  EQU. 23
$Re = \bar{m}_{ex} * D_{man}/(A_{passage} * \mu_g)$ Prandtl Number ($Pr$)  EQU. 24
$Pr = 0.66$ Convective coefficient  EQU. 25
$0.023 * Re^{0.8} * Pr^{0.3} * k_{ex}/D_{man}$ where, $D_{man}$ is the diameter of the manifold and $A_{passage}$ is the cross sectional area of the manifold's passage.

First, the rate of change of the manifold temperature is determined in a eighth control block 414. The temperature change is determined as a function of the net energy of the system divided by the specific heat times the mass of the system. The energy into the manifold will be from convection from the exhaust gases. The energy departing will be a two-fold loss, one from natural convection to the manifold surroundings, and the other will be the radiant energy dissipated by the manifold. The change in temperature is determined as:

$$dT/dt = \frac{h_{ex} * A_{si}(T_{ex1} - T_{man}) - h_a * A_{so}(T_{man} - T_a)}{\rho_{man} * vol_{man} * C_{man}} - \frac{\epsilon_{man} \sigma A_{so}(T_{man}^4 - T_a^4)}{\rho_{man} * vol_{man} * C_{man}}$$

EQU. 26 where $A_{si}$ and $A_{so}$ are the inner and outer surface areas of the manifold, respectively and $h_a$ is the heat transfer coefficient of the inside of the manifold.

Then, the temperature of the manifold is determined in a ninth control block 416. The manifold temperature is a function of the present temperature of the manifold and the rate at which the temperature is predicted to be changing over a period of time, $\Delta t$. The new manifold temperature is determined by:

$$T_{man,t+\Delta t} = T_{man,t} + (3*dT/dt_t - dT/dt_{t-\Delta t})*\Delta t/2.$$

EQU. 27

The amount of heat loss through the manifold can then be determined in an tenth control block 418 by:

$$Q_{man} = -h_{ex}*A_{si}*(T_{ex1} - T_{man,t})$$

EQU. 28

In an eleventh control block 420, the temperature of the exhaust gases is determined using the calculated manifold heat loss:

$$T_{ex} = (Q_{man} + m_{ex}*C_{ex}*T_{ex1})/(m_{ex}*C_{ex}).$$

EQU. 29

Figure 5:
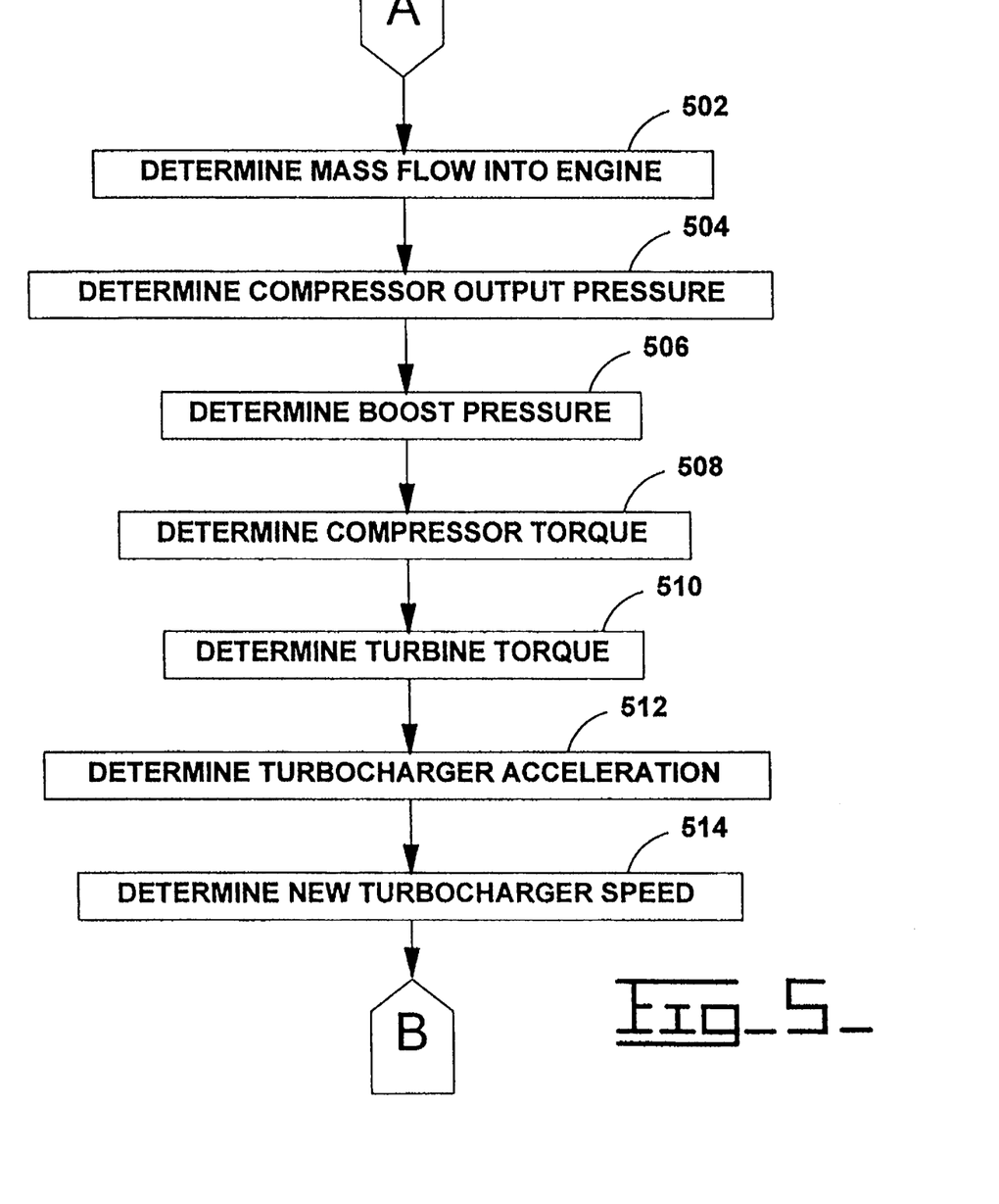
FIG. 5 is a second portion of a flow diagram illustrating the operation of the boost pressure model, according to an embodiment of the present invention.

In a twelfth control block 502, the mass flow ($\bar{m}_{af}$) into the engine 102 is determined. In the preferred embodiment, the mass flow into the engine is equal to the sum of the mass fuel flow and the mass air flow, $\bar{m}_{fuel}$, $\bar{m}_{air}$. In a thirteenth control block 504, the compressor output pressure is determined as a function of the mass air flow ($\bar{m}_{air}$), the inlet temperature and pressure, $T_a$, $P_a$, and the turbine speed. In the preferred embodiment, the compressor output pressure (COP) is determined from a map derived from manufacturer data. In a fourteenth control block 506, the boost pressure is determined by:

$$BOOST = COP - ((\bar{m}_{af})^2 * K8) - K9.$$

EQU. 30 where K8 and K9 are experimentally derived constants. In a fifteenth control block 508, the torque applied to the compressor 130 is determined. In the preferred embodiment the compressor torque is determined as a function of the mass air flow, the inlet temperature and pressure, and the turbine speed.

In the preferred embodiment, the boost pressure and the compressor torque are determined using maps based on manufacturer bench performance data.

In a sixteenth control block 510, the turbine torque is determined as a function of a mass exhaust flow ($\bar{m}_{exh}$), the turbine inlet temperature or modelled exhaust temperature ($T_{ex}$), the turbine temperature ratio, and the turbocharger speed. In a seventeenth control block 512, the acceleration of the turbine 132 is determined as a function of the compressor torque, the turbine torque, and the turbo inertia. In an eighteenth control block 514, the turbocharger speed is updated as a function of the old speed, the turbocharger acceleration and the time since the last update. The cycle repeats using the updated turbocharger speed.

Figure 7:
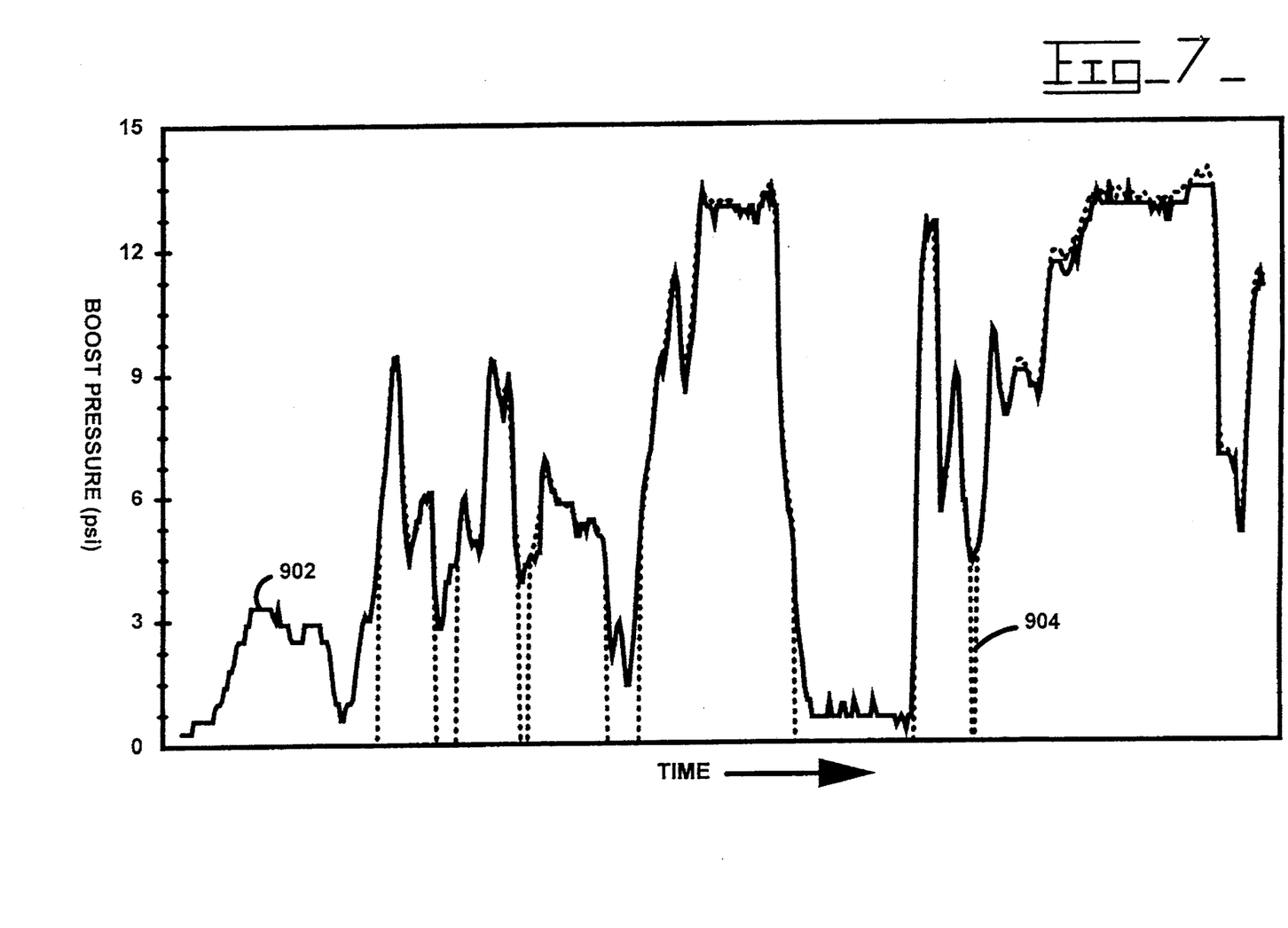
FIG. 7 is a graph of actual boost pressure and modelled boost pressure during operation of the engine versus time.

With reference to FIG. 7, the boost pressure model is used to indicate what the boost pressure of the engine should be given the current operating characteristics. The graph illustrates how closely the boost pressure model tracks the actual boost pressure during a sample run. The actual or measured data is shown by a solid line 902 and the modeled value is shown by a dotted line 904. As shown in the graph, during some periods of time, the boost pressure model does not return an estimate. The reason is that for the given operating conditions no performance maps for the compressor were currently available.

Figure 8:
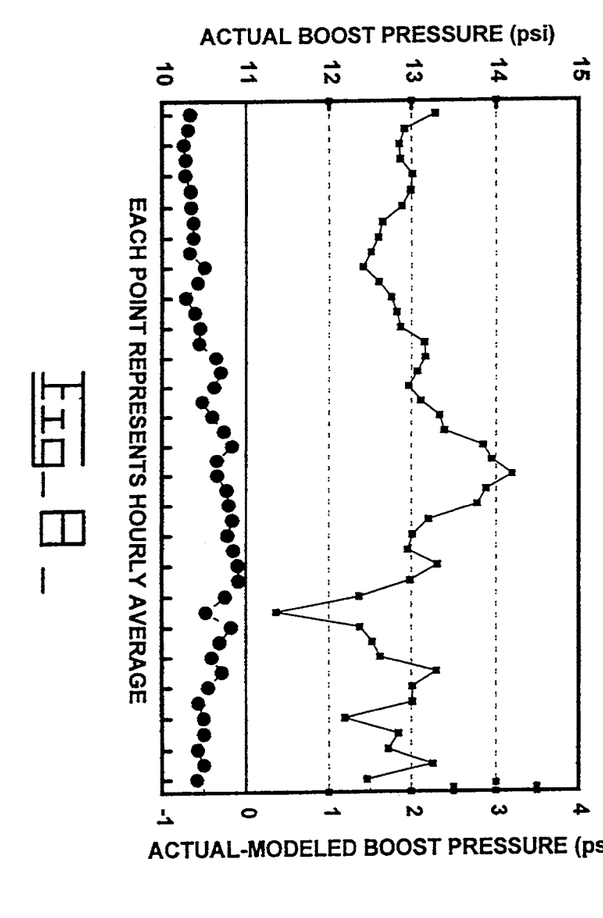
FIG. 8 is a graph illustrating actual boost pressure and actual boost pressure minus modelled boost pressure versus time.

With reference to FIG. 8, the difference between the actual boost pressure and the modeled boost pressure is used to diagnose the engine. As shown in FIG. 8, the data is averaged hourly and the difference (shown by a dotted line) between the actual boost pressure and the modeled boost pressure can vary by plus or minus 1 psi.

With reference to FIG. 3 and 13A, the diagnostic controller 206 includes indicating means for producing an acceptable signal in response to a predetermined condition and for producing an error signal in response to other predetermined conditions.

In one embodiment, the indicating means includes an operator indicator. The operator indicator includes a lamp, light, light emitting diode (LED) or similar device for signalling the presence of any error.

In another embodiment, the indicating means includes a means for producing a visual representation of a graph, similar to FIGS. 7 and/or 8. The graph producing means may include, among other things, a printer, a plotter, or a video screen or any similar device.

In a still further embodiment, the indicating means is adapted to controllably display graphs illustrating the actual and modeled values versus time and/or the differences between the actual and modeled values.

Industrial Applicability

With reference to the drawings and in operation, the present invention is adapted to provide diagnostic capabilities to a vehicle's engine. Ideally, the boost pressure model are run on an onboard computer for real-time modeling and diagnostic capabilities.

The computer based model receive sensor information from a plurality of sensors. Some of the sensor information and other engine parameters may be received from other modules that may already be on the vehicle. Optionally, the sensor information may be stored in memory for later processing and diagnostics or for further analysis. The amount of data stored may be considerably reduced by storing averages over a certain period of time and/or by storing data only under certain conditions, for example, a range of load on the engine or by rack position.

As described above, the sensor information is used to determine an estimated or modeled value of the boost pressure. These modeled values are compared with the actual values. Any deviation from the modeled values may be indicative of a problem.

If the values do deviate, an error signal or diagnostic signal is produced. Preferably, the present invention is adapted to give an immediate fault signal so that no further damage or a prevention of damage may occur.

In this manner, the present invention is adapted to provide onboard diagnostic capabilities and furthermore, may be able to detect failures before the operator feels or senses any significant performance loss.

Other aspects, objects, and advantages of this invention can be obtained from a study of the drawings, the disclosure, and the appended claims.

We claim:

1. A method for diagnosing an engine having an exhaust manifold and a turbocharger by modeling boost pressure, including the steps of:

sensing a boost pressure of said turbocharger and responsively delivering an measured boost pressure signal;

sensing at least one parameter of the engine and responsively producing at least one parameter signal;

receiving said at least one parameter signal and responsively determining a modeled exhaust temperature value;

sensing at least one other parameter of the engine and responsively producing at least one other parameter signal;

receiving said at least one other parameter signal and said modeled exhaust temperature value and responsively determining a modeled boost pressure value;

receiving said measured boost pressure signal and said modelled boost pressure signal, comparing said measured boost pressure signal and said modeled boost pressure value and responsively producing a difference signal; and receiving said difference signal and responsively diagnosing said engine.

2. A method, as set forth in claim 1, and wherein the step of determining a modeled exhaust temperature value includes the steps:

determining a mass flow efficiency of said engine and responsively producing a volumetric efficiency signal;

determining a fuel to air ratio and responsively producing a fuel to air ratio signal;

receiving said fuel to air ratio signal and said volumetric efficiency signal, responsively determining the power delivered to the pistons of said engine, and producing an indicated power signal indicative of said determined power;

receiving said indicated power signal, responsively determining the heat lost through said cylinders, and producing a cylinder heat loss signal indicative of said determine lost heat;

receiving said cylinder heat loss signal, responsively determining the temperature of the exhaust gas and producing a first temperature signal indicative of said determined temperature;

calculating the temperature of said exhaust manifold and responsively producing a manifold temperature signal;

receiving said first temperature signal and said manifold temperature signal, responsively determining the heat lost through said exhaust manifold, and producing a manifold heat loss signal indicative of said determined heat lost; and receiving said manifold heat loss signal, responsively determining an exhaust temperature, and producing an exhaust temperature signal indicative of said determined exhaust temperature.

3. A method, as set forth in claim 1, wherein said step of determining a modeled boost pressure value includes the steps of:

initializing a turbine speed of said turbocharger to a predetermined value;

determining the mass flow rate into the engine and responsively producing a mass flow signal;

sensing a filtered air pressure and temperature and responsively producing filtered air pressure and temperature signals, respectively;

sensing an intake manifold air temperature and responsively producing an intake manifold air temperature signal;

receiving said mass flow signal, turbine speed, said filtered air pressure and temperature signals, said intake manifold air temperature signal, and said modeled exhaust temperature value and responsively producing a boost pressure signal.

4. A method, as set forth in claim 3, including the steps of:

updating said turbine speed value;

receiving said mass flow signal, turbine speed, said filtered air pressure and temperature signals, said intake manifold air temperature signal, and said modeled exhaust temperature value and responsively producing an updated boost pressure signal.

5. A method, as set forth in claim 1, including the step of storing said at least one parameter signal and said at least one other parameter signal in a time history data file.

6. A method, as set forth in claim 5, including the step of producing a visual representation of said time history data file.

7. A method, as set forth in claim 1, including the step of storing said difference signal in a time history data file.

8. A method, as set forth in claim 7, wherein said time history data file includes a series of averages of said first and second difference signals.

9. A method, as set forth in claim 8, wherein each of said averages is taken over a predetermined amount of time.

10. A method, as set forth in claim 7, including the step of producing a visual representation of said time history data file.

11. A method, as set forth in claim 1, wherein the engine includes a plurality of cylinders, an intake manifold, and an exhaust manifold and wherein said first operating characteristic is the temperature of exhaust gases in said exhaust manifold.

12. A method, as set forth in claim 11, wherein the step of sensing at least one parameter of said engine includes the step of sensing a first set of parameters of said engine.

13. A method, as set forth in claim 12, wherein said first set of parameters includes the pressure of said intake manifold, the temperature of said intake manifold, and the temperature of fuel delivered to said engine.

14. A method, as set forth in claim 12, including the step of storing said first set of parameters in a time history data file.

15. A method, as set forth in claim 14, including the step of producing a visual representation of said time history data file.

16. A method, as set forth in claim 1, wherein the step of sensing at least one other parameter of said engine includes the step of sensing a second set of parameters of said engine.

17. A method, as set forth in claim 16, wherein said turbocharger includes a compressor, said engine includes an intake manifold, an exhaust manifold, and an air filter connected to said compressor and wherein said second set of parameters includes the pressure of said intake manifold, the temperature of said intake manifold, the temperature and pressure of the air between said compressor and said air filter, and the temperature of said exhaust manifold.

18. A method, as set forth in claim 1, wherein said step of diagnosing said engine includes the step of producing an error signal as a function of the magnitudes of said first and second difference signals.

* * * * *